(No Model.)  10 Sheets—Sheet 1.

J. R. SAPP.
CASH RECEIVING, DELIVERING, AND RECORDING DEVICE.

No. 537,488. Patented Apr. 16, 1895.

Fig. 1.

WITNESSES
Belle S. Lowrie.
Ida Oser

INVENTOR.
Joseph R. Sapp.
by C. E. Humphrey,
ATTORNEY (No Model.)  10 Sheets—Sheet 2.
J. R. SAPP.
CASH RECEIVING, DELIVERING, AND RECORDING DEVICE.

No. 537,488. Patented Apr. 16, 1895.

Fig. 2.

WITNESSES
Belle S. Lowrie.
Ida Oser

INVENTOR
Joseph R Sapp
by C. E. Humphrey
ATTORNEY (No Model.) 10 Sheets—Sheet 4.

J. R. SAPP.
CASH RECEIVING, DELIVERING, AND RECORDING DEVICE.

No. 537,488. Patented Apr. 16, 1895.

Fig. 4.

Witnesses
Belle S. Lowrie.
Ida Oser.

Inventor
Joseph R. Sapp
by C. E. Humphrey
Attorney (No Model.)       J. R. SAPP.       10 Sheets—Sheet 5.
CASH RECEIVING, DELIVERING, AND RECORDING DEVICE.
No. 537,488.                Patented Apr. 16, 1895.

(No Model.) 10 Sheets—Sheet 7.
J. R. SAPP.
CASH RECEIVING, DELIVERING, AND RECORDING DEVICE.

No. 537,488. Patented Apr. 16, 1895.

WITNESSES
Belle S. Lowrie
Ida Oser

INVENTOR
Joseph R. Sapp
by C. E. Humphrey
ATTORNEY

UNITED STATES PATENT OFFICE.

JOSEPH R. SAPP, OF CUYAHOGA FALLS, OHIO.

CASH RECEIVING, DELIVERING, AND RECORDING DEVICE.

SPECIFICATION forming part of Letters Patent No. 537,488, dated April 16, 1895.

Application filed January 12, 1895. Serial No. 534,648. (No model.)

*To all whom it may concern:*

Be it known that I, JOSEPH R. SAPP, a citizen of the United States, residing at Cuyahoga Falls, in the county of Summit and State of Ohio, have invented a certain new and useful Improvement in Cash-Recorders, of which the following is a specification.

My invention has relation to the construction of cash recorders.

The objects of my invention are to construct a recorder which shall afford a substantially complete check against fraud and unauthorized tampering; one which will detail accurately every transaction, both in regard to money put into the recorder as well as money taken out; one which permits the operator to note on a separately guarded memorandum, a statement of each sale and, finally, to make a cash recorder which shall fulfill all requirements of the common recorders of commerce.

To the aforesaid objects my invention consists in the peculiar and novel construction, combination and arrangement of the various parts hereinafter described and then specifically claimed, reference being had to accompanying drawings forming a part of this specification.

In the drawings in which similar reference numerals indicate like parts in the different views.

In the drawings 1 and 2 are the side plates of the inclosing box. These are connected by a hood 3, back plate 4, and bottom 5. On the back and right hand sides, the box extends from the hood portion a slight distance to furnish the necessary room for the mechanism. On the right side the space thus made is occupied by two drawers 6 and 7, which can be utilized for bills or any desired purpose. Between the side plates 1 and 2 is a shelf 8, which will be more specifically described later. Below this shelf is a second shelf and below this and between plates 1 and 2, and journaled therein is a shaft 9. Mounted upon this shaft 9, and fast therewith is a swinging hood-shaped lid or cover 10. This is arranged to swing down and forward and when raised to cover the front of the machine between plates 1 and 2, it is held shut by a latch 11 operated by button 12. This lid serves as the temporary receptacle for money which is to be returned to a purchaser on a sale as change, dropping into it from the coin tubes, to be described. In the lower back part of the box is a roll of paper 13, in a holder 14, which paper is fed over a roller 15, and around a second roller 16, and out. While passing over the top of roller 16, it is printed and stamped with the various cash transactions of the operator by mechanism to be described. The roller extends under the cover over the drawer 6, which is provided with a slot, to enable the operator to write any desired memoranda upon the roll of paper on the roll 16. This paper is caused to move forward an arbitrary distance at each opening of the lid 10 in the following manner: Near the left end of shaft 9, and rigid therewith, is a wheel 17, having on one face a pin 18, to which is attached a connecting rod 19; the other end of which is attached to one end of a rocking arm 20, rigid on shaft 21, bearing the roller 16. The other end of arm 20, bears a pawl 22, inclosed in a box 23, normally pressed against end 26 of roller 16, by a spring 24, in box 23. The end 25 of spring 24 projects through an opening in box 23, to enable a person to press back spring 24 and pawl 22, and allow the roller 16, to be revolved backward, if desired. The end face 26 of roller 16, is provided with a ratchet or notches into which the pawl 22 catches. It will be readily seen that the opening and closing of lid 10 actuate this pawl carrying arm and revolves the roller, 16, a determinate distance.

At right angles and fastened on arm 20, is a bracket 27, having in its outer end a hooked wire 28, the hooked end of which is sharpened and engages a ratchet 29 on a roller 30, on a stud 31. A second roller 32, on a stud 33, presses against and rotates with roller 30, and between them an ink ribbon 122 is placed. These studs 31 and 33 are fastened to a three-sided plate 34 fastened to and extending from the termination of cross bar 84, fastened to side plate 1. On the inner upper faces of plates 1 and 2 are blocks 35 and 36, into which is screwed a series of pins 37. Starting at the point 38 the ink ribbon passes up around pins 37 across from one side to the other and back, a desired number of times and down on the other side around back of a bracket 39, along the upper face of roller 16, around roller 30 and between it and roller 32 to the place of beginning. The object of making the ribbon traverse so great a distance is in order to use as long a ribbon as possible and make it continuous without making it feed back and forth and also to clear the intervening mechanism. On the shaft 9, are rock shafts 40 and 41 fastened rigid thereto. To these are pivotally fastened connecting rods 42 and 43 respectively, the other ends of which are fastened to a rod 44, extending between two bent levers 45 and 46 pivoted on studs 47 in the inner side of plates 1 and 2. The other ends of levers 45 and 46 are fastened into the ends of a printing bar 48, having on its lower face type 49 of any desired class or kind. The under face of the type is immediately above the ink ribbon over the roller 16. It will be apparent that when the lid 10 is opened it presses down the type bar and type upon the ink ribbon, and printing thereon the characters on the type face. These types are so arranged that on one side of the center line they represent the cents, dimes, nickels, quarters, halves, dollars, &c., paid out and on the other side the amount taken in.

Near the center of shaft 9, is a rocking arm 50 fast on said shaft to which is a downwardly curved lever, 51, arranged to actuate a bell, 52, placed on the bottom of the recorder. This bell rings each time the lid 10 is opened.

Figures 13, 14, 17:
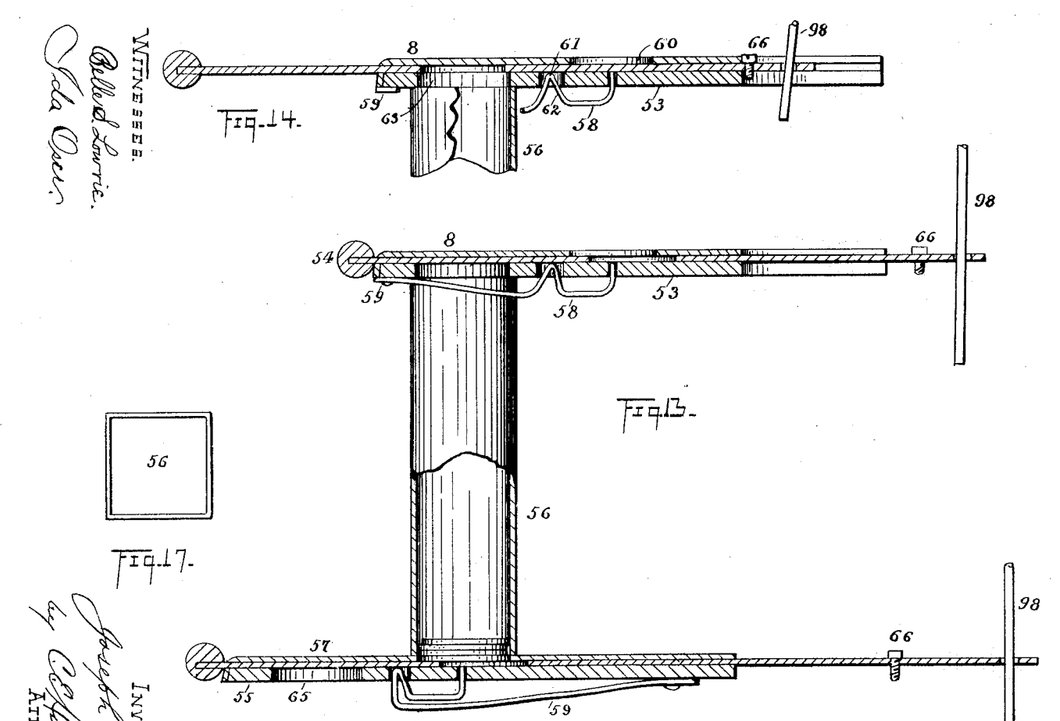
Figs. 13, 14 and 15, details of coin slides.
Figs. 16 and 17, details of modifications of the forms of coin tubes.

We now come to a description of the coin receivers. In the face of the shelf 8 is a series of openings of different diameters to suit the appropriate size of the coin. Under the shelf 8 is a plate 53, fastened to the shelf 8 by screws and sustained on brackets on the inner faces of plates 1 and 2. A short distance below shelf 8 is a like shelf 57, and plate 55. Between these two extend short tubes 56, which are placed immediately below their respective opening in plate 53, and above the opening in shelf 57. Between shelf 8 and plate 53, and shelf 57 and plate 55 are slides 54. The shelves and plates are cut away sufficiently to enable the slides to be easily movable. These slides have an opening in them which when the slides are pushed in, is farther back of the recorder than the opening in shelf 8, but when pulled out will register with the opening in plate 53. On the under face of plate 53 is fastened a spring 58, with its end bent at substantially a right angle to its length and between which end and its anchored end 59, is bent up and back on itself to form a hump 61, of the same height as the bent end. The spring is of such length that the bent end will normally be in the center of opening 60, in shelf 8 and its hump 61 will enter a small opening 62 in plate 53. The operation of this slide is as follows: Suppose a nickel is placed in the opening 60. There it stays until the slide 54 is pulled out so that its opening is exactly coincident with opening 60. The spring 58 is prevented from entering the opening 60, by the hump 61, striking (through the opening 62) on the under face of slide 54. While the slide is being pulled farther out the nickel fills the opening in slide 54 and thus prevents the spring 58 from rising into opening 60, until the opening in slide 54 passes its upturned end and the opening in slide 44 is over the opening 62, when the solid portion of slide 54 covers the opening 60 and stops the end of spring 58. When the opening in the slide 54 is coincident with the opening 63 in plate 33 the coin falls into the tube 56 and is arrested by the slide 64 between shelf 57 and plate 58, where the same operation is repeated exactly, the coin leaving through the opening 65 and dropping onto the lid 10.

Should an attempt be made to pull open one of the slides without putting a proper coin in the opening 60, the slide 54 will pull out until its opening is over the opening 62 when the hump 61 enters it, permitting the point to fly upward into opening 60, preventing any forward motion thus affording a check against the operation of the machine without the proper deposit being made. A stop 66, is placed in slides 54 and 64 to prevent their being pulled out too far. A different form of spring is shown attached to the plate 55, but its operation is the same.

Figure 15:
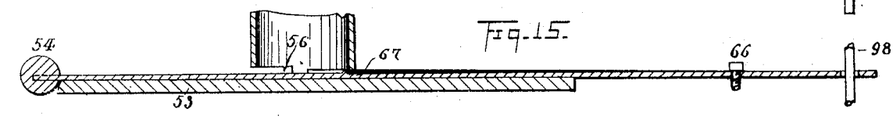

In Fig. 15 is shown a slightly different form of slide for the bottom of the tube, which enables the coin to be drawn out on the upper face of the slide instead of dropping through to the lid 10. In this form the slide is unperforated but has a thick portion 67 at its back extending the entire distance from the ridge under the tube to the stop 66. The bottom of the tube is cut away on its front and rear to enable this raised portion to pass thereunder. The coins fall upon the reduced portion of the slide and are caught and drawn forward by the ridge at the commencement of the raised portion, and during their passage under the tube end this thickened portion sustains the remaining coins so that they do not fall any lower until the slide is back and the reduced portion is under the tube ready for the next coin.

Figure 16:
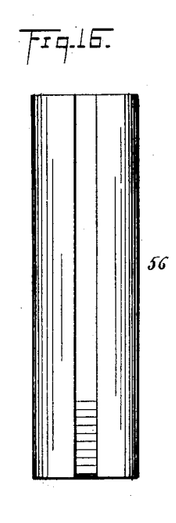

Fig. 16 shows a coin tube slotted on its side to expose the contents to the view of the operator; and Fig. 17, shows the plan of a different form of coin tube which I sometimes use.

Figure 18:
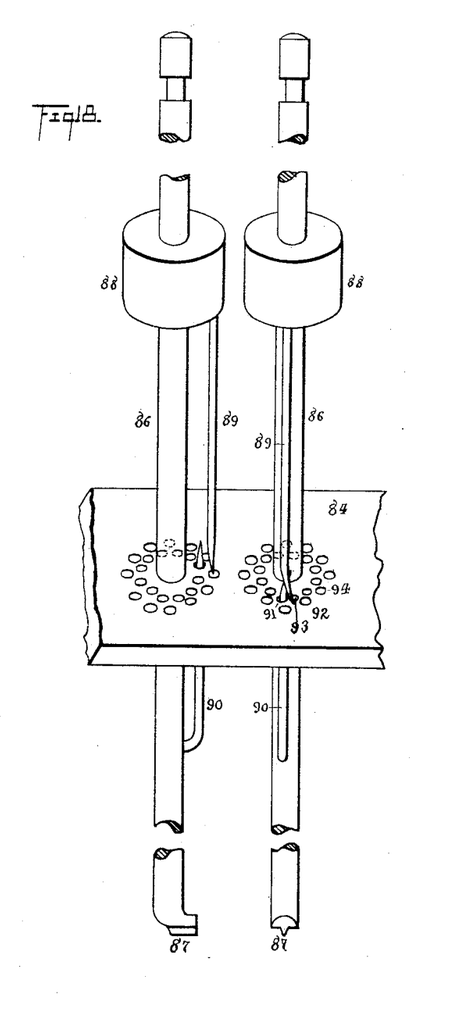
Fig. 18, a view of one of the printing rods.
Figure 19:
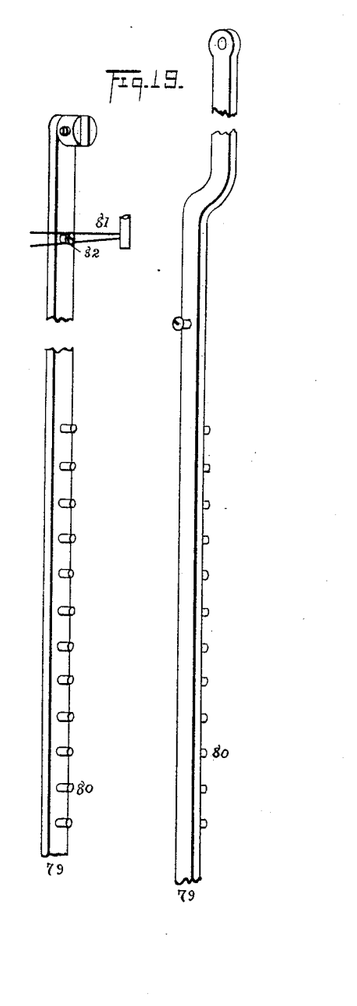
Fig. 19, a view of the rods operated by the bill drawers.

The space bounded by the tube last referred to and the side plate 2, and the plate 53 and shelf 57 is divided vertically by partitions into a number of compartments which are filled by a series of tiers of drawers 68, sliding in ways provided on the inner sides of these dividing partitions 69, and each drawer is provided with a handle for convenience in use. The front end of this drawer (the description for one serving for all) is made with a bottom and a hinged lid 71. Back of this the drawer 68 consists of two side bars 72 and 73 united by an end bar 74. On the inner faces of the side bars 72 and 73 are diamond shaped plates 75 and 76 preferably integral with the bars 72 and 73 but so placed that edge 77 of plate 75' inclines downward from the point 78 to the point 124; and the corresponding edge on the plate 76 is just the reverse of this, inclining from the point 80 downward in the direction of the covered portion of the drawer, so that the apex of the diamond 75 is at the bottom of the bar 72 and the apex of the diamond 76 at the top of the bar 73. These diamonds are used to raise and lower a number of upright levers 79 having a series of studs 80 set in the sides thereof. These levers 79 slide in perforations in shelf 8 and in a prolongation of shelf 57. When the drawer 68 is pulled out the diamond shaped plate runs its apex under stud 80, which, rides up the incline, along its top edge and over its other apex and is forced down by spring 81 pressing against a screw 82. These springs 81 are fastened to a bar 83 sustained by uprights 84 on shelf 8. Now when the drawer 68 is pushed in the diamond 75 on the opposite side 72 runs under a stud on a lever on its side and raises it, thus operating alternately one then the other of its respective pair of levers, indicating each withdrawal and return of the drawer 68. There is a pair of these rods or levers for each tier of drawers and each drawer operates the two levers assigned to it by their respective studs. In the back of the recorder immediately over the printing roller 16, is a frame consisting of bars 84 and 85 fastened at one end to plate 2 and at the other end to a three sided plate made in the form of a square with one side open and numbered 34 inclosing the ink ribbon rollers and surrounding them and fastened to the plate 1. These bars are parallel to the axis of the roller 16 and are perforated at determinate intervals, and the perforations are vertically in alignment. These perforations form the guides for a series of upright rods 86, the lower ends of which are provided with a square and preferably provided with a ridge 87 used to make an impression when the rod drops, similar in form to a dash in printing (—), but other forms of type as figures, letters and indicia of various forms and configurations may be used in place of the dash (—). The foot or lower end of these rods turns to one side so that the ridge 87 is to one side of the axis of the rod, but radial thereto. These rods are arranged to revolve in plates 84 and 85 as journals. This revolution is attained in the following manner. In the plate 84 around the main perforation are two concentric circles of small perforations alternating with each other. Above the plate 84 on the rod 86 is a collar 88, from the under face of which depends a needle 89 with its point slightly bent to one side, and from below the plate 84 fastened to the rod 86 is a second needle 90, rising vertically and slightly passing the point of the needle 89, with its point turned a little in the same direction as needle 89. When the rod 89 is worked up and down by mechanism to be described needle 90 enters hole 91 on the upward stroke, needle 89 enters hole 92 on the next downward stroke, rotating rod 86 one-twelfth of a revolution, then needle 90 enters hole 93 on the next upward stroke followed by needle 89 entering hole 94 and so on around the entire circle of perforations. It will be seen that the printing ridge, being away from the center and being constantly revolved step by step, will make an impression on the paper similar to a star, (see Fig. 24), one stroke for each downward motion of the rod 89. The rods 86 are operated by the opening and closing of the slides, at the top and bottom of the coin tubes 56, and by the pulling out and return of the bill drawers, 68. In the recorder shown, as there are five coin tubes and each has two slides there are ten rods for them, and each tier of drawers has a pair of rods, and there are four tiers shown making eight rods for the drawers and in all eighteen rods, all the drawers in each tier being intended to contain bills of like denomination.

Figures 20, 21, 22, 24:
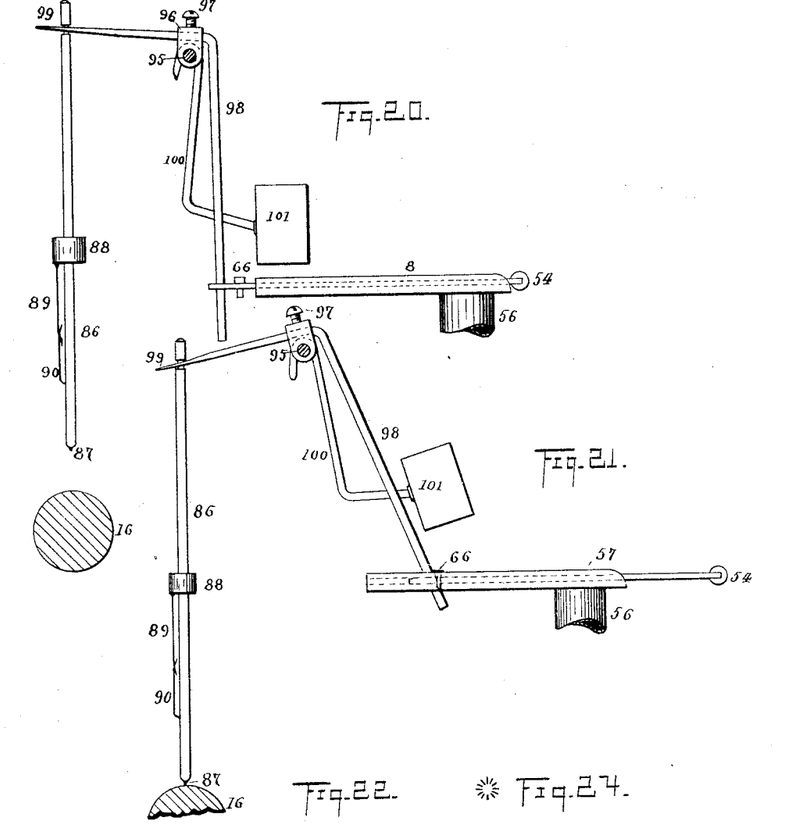
Figs. 20 and 21, details of the connecting mechanism showing the coin slides operating the printing rods.
Fig. 22, a view of the printed record of the machine.
Fig. 24, a fac-simile of the impression of the printing bar.

In Figs. 20 and 21, the manner in which the coin tubes 54 operate the rods is most clearly shown. Extending across near the top of the hood 3, between and fastened to plates 1 and 2 is a shaft 95, parallel to the roller 16. On this shaft are a number of clips 96, perforated at right angles to the shaft 95, and provided with a set screw 97, in which perforation and fastened by the set screw 97 is a rod 98, bent at an angle of about one hundred degrees the lower end of which depends through an opening in its respective coin slide. The other end 99, is bifurcated and straddles the reduced place at the upper end of rod 86. Also hooked upon this shaft 95, is a bent rod 100, terminating in a weight 101. It is seen from the drawings that the pulling out of the coin slide 54, lowers the end 99 of the pivoted rod 98, thereby driving the type end 87 against the tube ribbon over the roller 16. The weight 101, by gravity returns the slide, 54, rod 98, and rod 86 to their normal positions. The slide at the bottom of the coin tube performs the same office in precisely the same way and its description would be superfluous.

Figure 1:
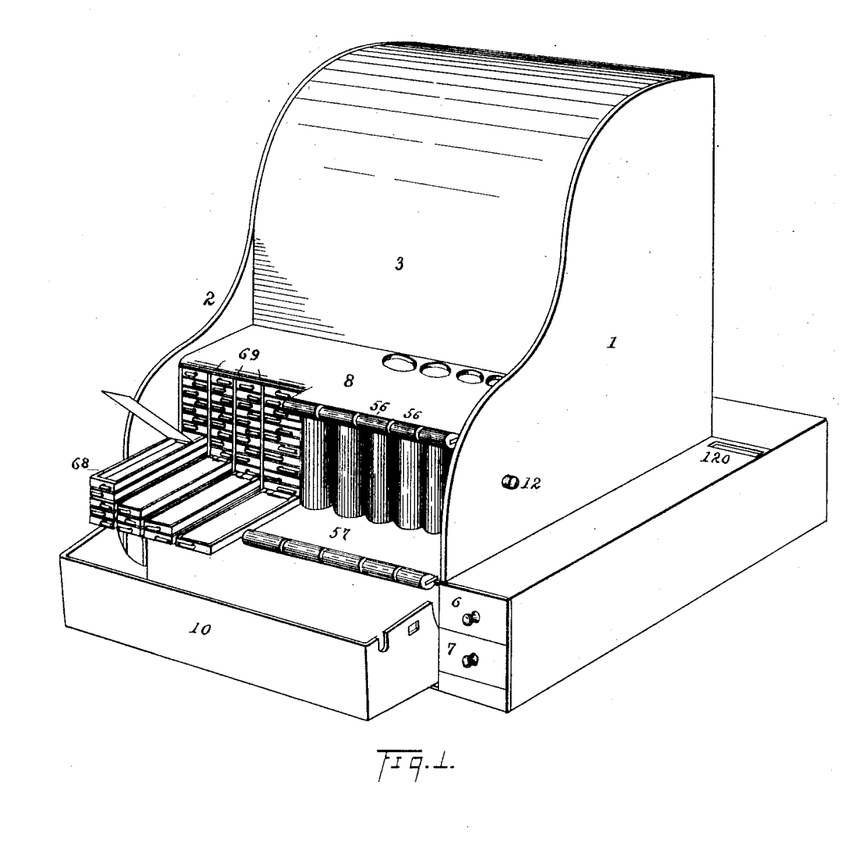
Figure 1 is a perspective of a complete machine with the front lid open.
Figure 2:
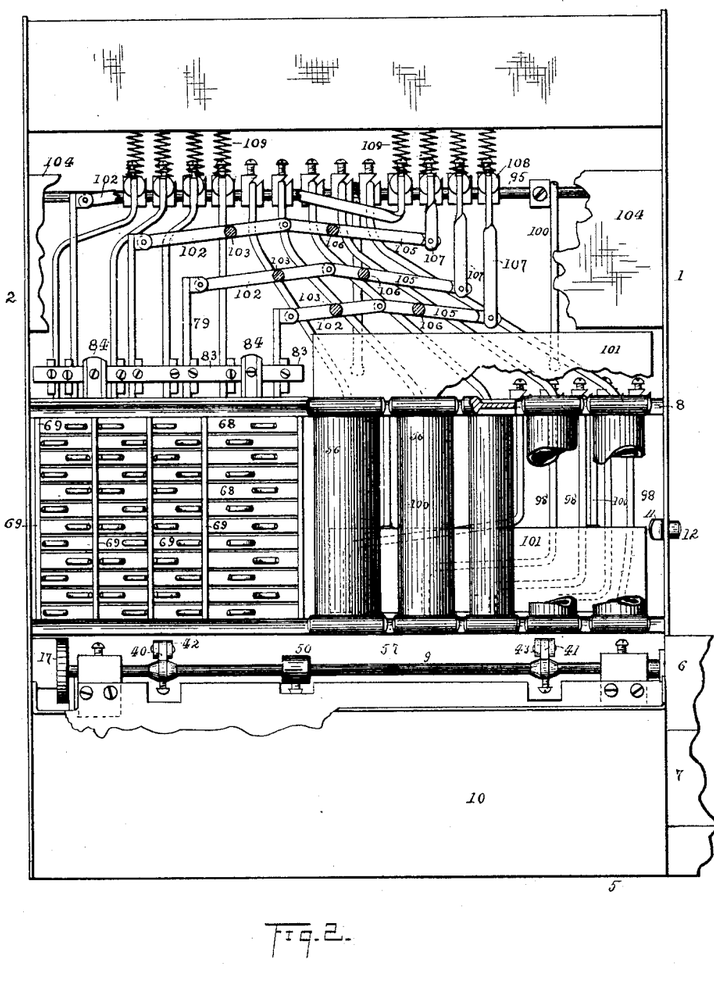
Fig. 2 is a front elevation with certain parts broken away to better illustrate the operative mechanism.
Figure 3:
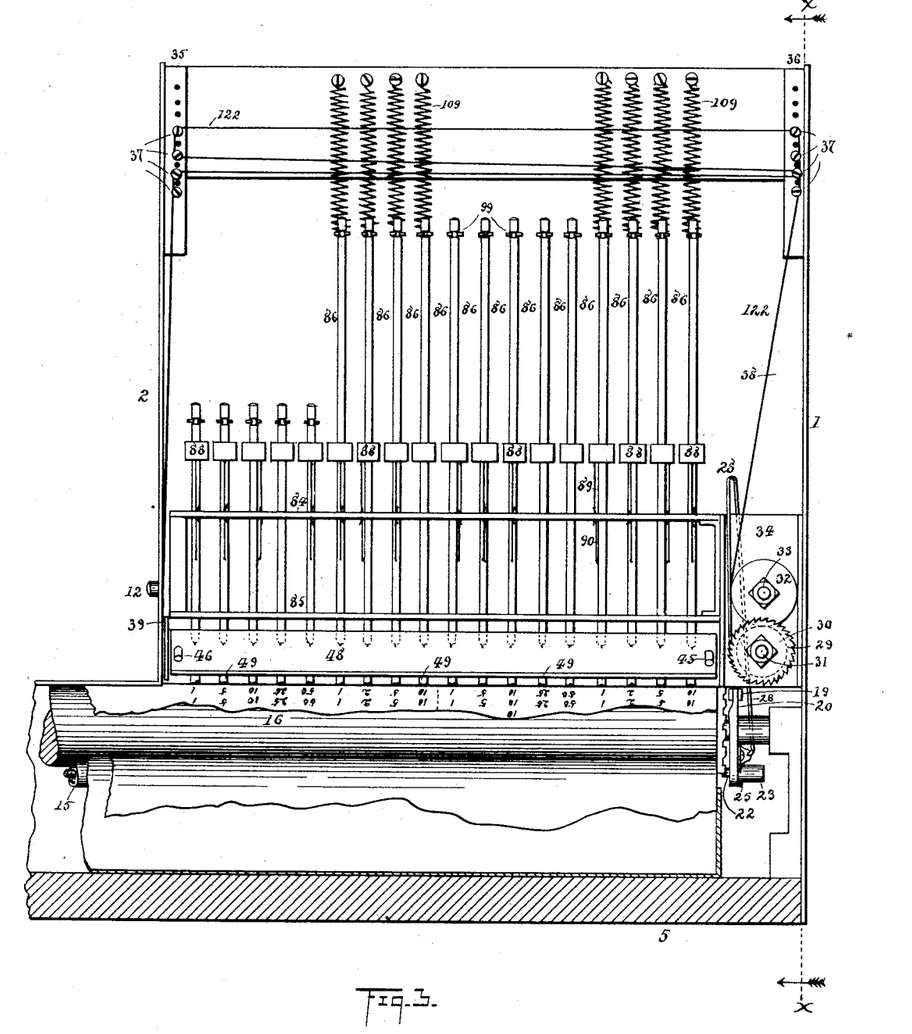
Fig. 3, a rear elevation of the recorder, showing a little of the bottom in section where it is broken away.
Figure 4:
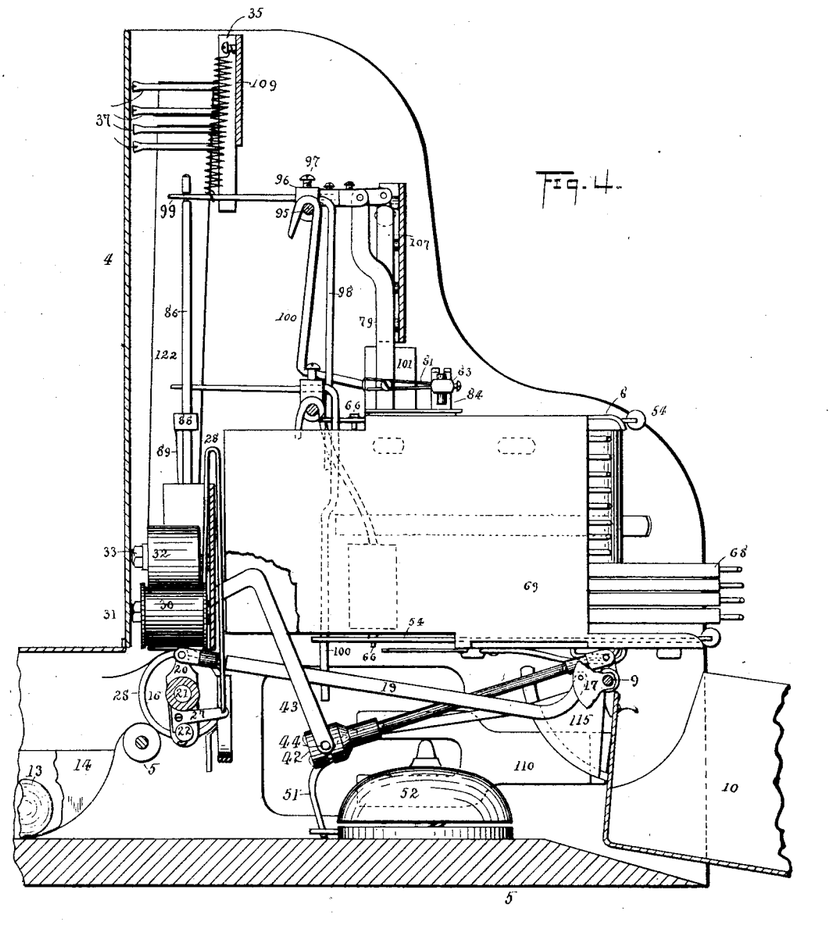
Fig. 4 is a section at the line X—X of Fig. 3.

In Figs. 2 and 4 is seen the way in which the bill drawers 68, operate their respective printing rods.

I have already shown how levers 79 are raised and depressed alternately by the diamond shaped plates on the drawers. Now to the upper ends, of all rods 79, situated on the right looking into the machine as seen in Fig. 2, and to each tier of drawers, 68, is hinged a lever 102, pivoted by studs 103, on a face plate 104, (broken away to better illustrate my invention but leaving the studs shown in section.) These levers 102 are hinged to secondary levers, 105, on studs 106, fastened like studs 103. These levers 105, are pivotally connected to upright rods, 107, which in their turn are hinged to rocking levers, 108, which pivot on the shaft 95, in like manner with rods 98, and like them terminate in bifurcated ends to grasp the rods 86. All the rods on the left of each tier of drawers 68, connect directly with the rocking levers 108, some of them being necessarily somewhat curved. So it will be seen that the moving of the rods 79, will raise and lower the rods 86, through this chain of levers. Between the shaft 95, and the bifurcated ends of levers 108, springs 109 are hooked on the rods to aid in returning the rods to their normally respective places.

Figure 5:
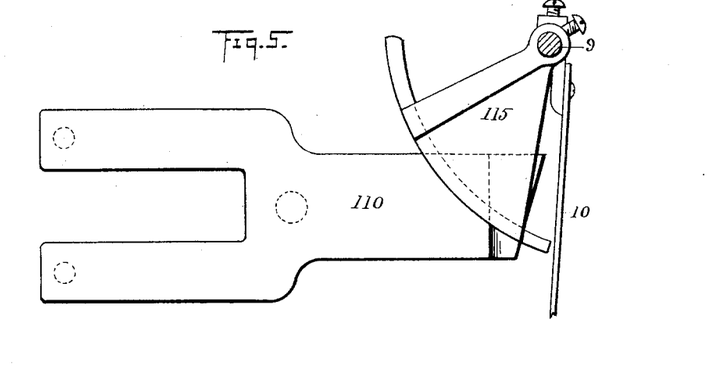
Figs. 5, 6, and 7, details of the lock for the two drawers shown in Fig. 1, at the right.
Figure 6:
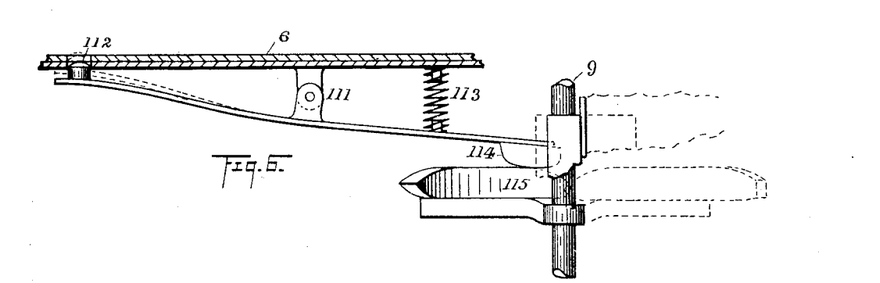
Figure 7:
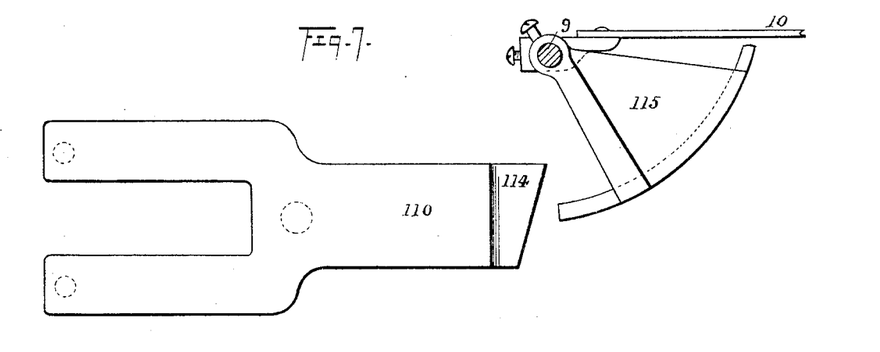
Figure 8:
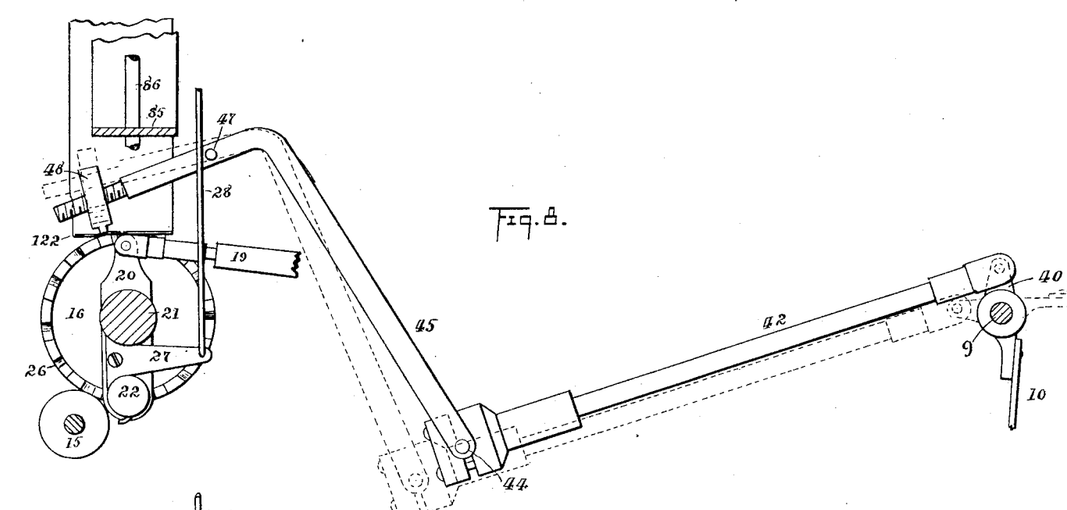
Fig. 8, a detail of the printing mechanism.
Figure 9:
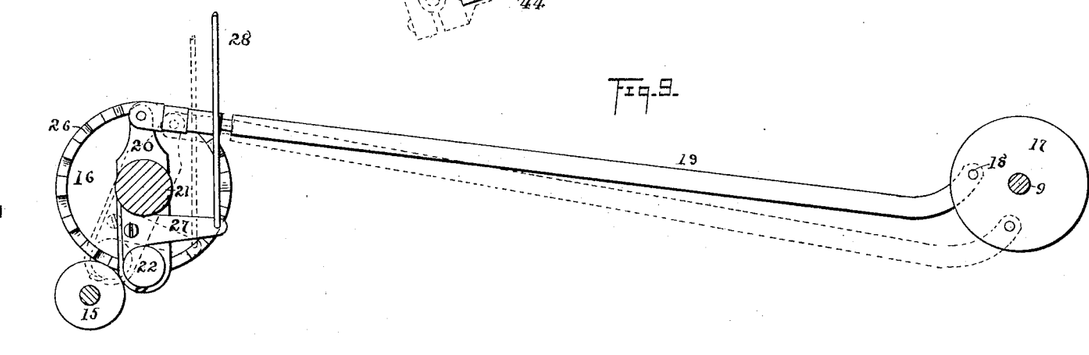
Fig. 9, a detail of the printing roller, feeding mechanism.

The drawers 6 and 7 are locked when the lid 10 is up by devices illustrated in Figs. 5, 6, and 7. They are locked simultaneously and by the same device, so the description for one will answer for both.

Fig. 5 shows in detail the same view as is seen in Fig. 4. A bifurcated plate 110 pivoted in the center by hinge 111, has a stud 112 on one end the outer end being normally pressed outward by a spring 113 and terminates in a boss 114, with an inclined edge. Rigid on shaft 9 is a circular wedge-shaped plate 115, arranged to rock back and forth with the shaft as it is moved by the lid 10. The edge of this wedge-shaped plate 115 engages the boss 114 and forces it toward the wall of the recorder, thus tilting up the other end. The stud at the other end is placed so as to enter an orifice in the partition between the drawers 6 and 7 and the main part of the recorder, also the drawers 6 and 7 are likewise perforated; these perforations being so arranged that when the drawers are pushed in, the holes therein will register with the holes in the partition wall. Into these openings the stud passes preventing the withdrawal of the drawers until released by the throwing out of the stud 112, by the wedge 115 striking the boss 114.

Figure 10:
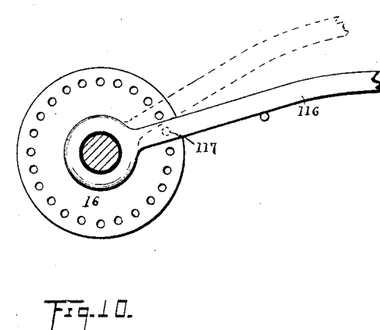
Fig. 10, a hand adjusting device for setting the roller.
Figure 11:
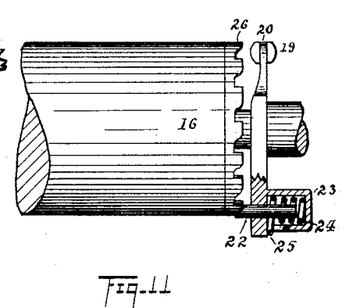
Fig. 11, a view of the end of the roller and a spring pawl used to revolve it.
Figure 12:
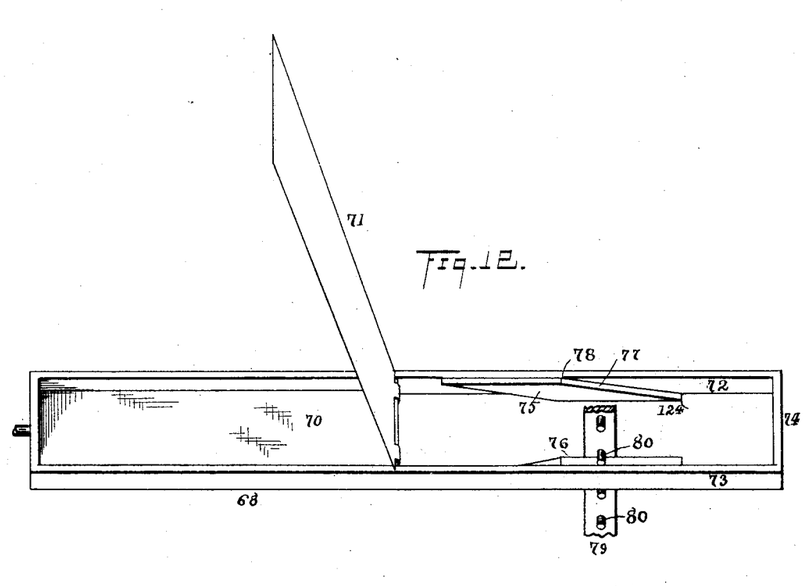
Fig. 12, a detail of one of the boxes for the bills.

In Fig. 10 I show a small hand lever 116, by which I can move the printing roller 16, without operating the entire recorder. It consists simply of a hand lever terminating in a loop around the roller shaft and having a stud 117 which enters small holes in the end (the opposite one from the one shown in Fig. 11) and by pressing this stud into one of these holes the roller 16 can easily be revolved.

Figure 23:
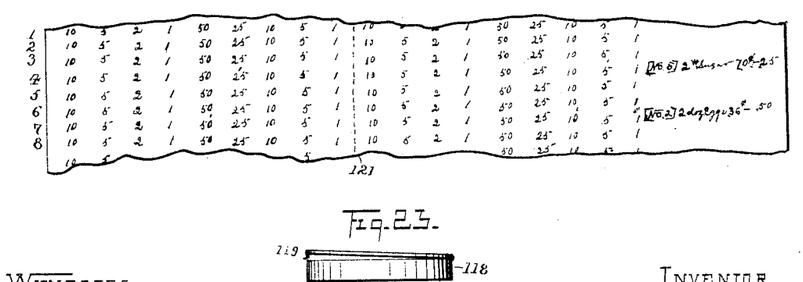
Fig. 23, a box in which bills are placed when desired.

In Fig. 23, I show a small shallow box 118, in which I can place bills, it having a lid 119, provided with a spring catch. It is adapted to be used when I do not use the bill drawers 68, but provide tubes similar to tubes 56, only larger, the bill being placed within box 118, and this box drops into the tube in the same manner as a silver dollar would.

Now in understanding the operation of this recorder, it must be borne in mind that the row of figures 10 5 2 1 50 25 10 5 1   10 5 2 1 50 25 10 5 1 is printed each and every time the lid 10 is opened, but if a coin slide or bill drawer is pulled out a single dash is made adjacent to the number on the paper, indicating the respective amount. Now in Fig. 22, it is shown that two sales were made as follows: Clerk (No. 5) sold two pounds of sugar, received twenty-five cents therefor and returned to the purchaser five cents change. This is shown in this manner: All dashes adjacent to numerals on the left side of the dotted line 121, indicate money paid in, and it there shows a dash just above the twenty-five cent mark in line four of the fragment of printed paper. The other side of the dotted line indicates money taken out of the recorder, and there is a dash directly over the five cent mark in the five cent column which must necessarily leave twenty cents in the recorder, equaling the amount of the sale. The next sale was by clerk (No. 2) and this sale was two dozen eggs amounting to thirty-six cents. The clerk received a fifty cent piece, as shown by the dash near the numeral 50 in line seven of the fifty cent column, and he returned fourteen cents change indicated by a dash over the "10" in the same line but on the right side of the dotted center line; also the four cents are indicated by the four dashes over the "1" in the one cent column.

The general operation of the machine is as follows:—All the bill drawers 68 are supposed to be pulled out ready to receive the bills, and lid 10 closed and the roll of paper in place. First the lid 10 is opened by pressing the pin 12. The opening of this lid presses down the printing bar 48, making one complete impression across the paper. Then whatever bills are to go into the drawers are placed therein, and each drawer having a bill within is closed, registering upon the roll of paper by a dash for each closing thereof. The coins one at a time are placed in their coin tubes through the orifice in the slides, each motion thereof registering on the paper, the coin and bills remaining in their respective depositories until needed, when they are removed—the bills by pulling open the drawer containing a bill of the required denomination and the coins by operating the slide at the bottom of the tube containing the required coin which drops into the open lid 10, each withdrawal of the bill drawer and bottom slide of course registering upon the paper on the roll. The closing of lid 10, moves forward the paper by a partial revolution of the roller 16, ready for the next transaction.

What I claim is—

1. A cash recorder consisting of an inclosing case provided with a lid, a shaft journaled in said case and actuated by said lid, a printing bar operated by said shaft and mounted pivotally in said case, a printing roller carrying a strip of paper to receive impressions from said bar; a series of coin holding tubes provided with inlet and outlet slides, and a number of printing rods mounted in said case operated by said slides and recording each manipulation of said slides, substantially as shown and described.

2. A cash recorder having a hinged lid and a shaft journaled in the said recorder and actuated by said lid, a pivoted printing bar actuated by said shaft and printing through an ink ribbon upon a strip of paper, a roller carrying said paper, a series of coin tubes provided with inlet and outlet coin slides, a number of printing rods in said case to record upon said paper each manipulation of said slides, a number of drawers in said recorder independent of said printing mechanism, normally locked when said lid is closed, and unlocked when said lid is opened, by a lock operated by said lid, substantially as shown and described.

3. A cash recorder provided with a lid, a shaft and pivoted printing bar, both mounted in said recorder, said shaft actuating said bar, and causing said bar to print through an ink ribbon upon a strip of paper, a roller in said case carrying said paper, a series of coin tubes provided with inlet and outlet coin slides, a series of printing rods operated by said slides through connecting levers and recording each manipulation thereof upon said paper, a number of drawers within said recorder, said drawers being perforated on their inner sides, the perforations being placed to register with similar perforations in the partition wall between said drawers and said lid, a stud to enter said coincident perforations, a pivoted lever bearing on said stud on its free end, a wedge mounted on said shaft, said lever being so placed as to be pushed back and forth by said wedge, and withdraw said stud from said perforations and release said drawers when said lid is opened substantially as shown and described.

4. A cash recorder provided with a lid, a shaft journaled in said recorder, bearing and actuated by said lid, a roller carrying a strip of paper, a pawl and ratchet actuated by said shaft, and in their turn revolving said roller, a pivoted printing bar mounted in said recorder operated by said shaft through connecting mechanism, and a number of coin tubes provided with inlet and outlet coin slides, a series of printing rods mounted in said recorder actuated by said slides to record each manipulation thereof on said paper, substantially as shown and described.

5. The combination in a cash recorder of a lid, a shaft carrying said lid journaled in said recorder, a roller carrying a strip of paper, printing rods mounted therein for making impressions on said paper, a series of coin slides, forming the inlet and outlet of coin holding tubes, a pivoted printing bar operated by said shaft to make impressions upon said paper simultaneously with the opening of said lid, substantially as shown and described.

6. In a cash recorder having a hinged lid, a shaft journaled in said recorder, a crank mounted on said shaft, a roller mounted therein carrying a strip of paper and operated by said crank through a connecting rod; a pair of cranks mounted on said shaft and having connecting rods attached thereto, a pivoted printing bar operated by said connecting rods to cause said printing bar to record impressions on said strip of paper, in combination with a separate crank and a bent lever hinged thereto, of a bell placed in said recorder operated by said crank and lever at each opening of said lid, substantially as shown and described.

7. In a cash recorder provided with a hinged lid, a shaft journaled in said recorder, a pair of cranks mounted thereon, a pivoted printing bar connected to said cranks to be swung down upon a strip of paper, a roller carrying said paper, operated by said shaft through connecting rods in combination with a series of coin tubes in said recorder, having inlet and outlet slides, and a series of printing rods operated by said slides through connecting rods to record each manipulation of said slides, substantially as shown and described.

8. The combination in a cash recorder of a pair of shelves, each shelf having a lower plate attached to it, said shelves and plates having non-coincident perforations, a series of coin tubes arranged to extend from the plate under the upper shelf to the upper face of the lower shelf, a number of coin slides adapted to receive coins placed in the perforations in said upper shelf and deposit them in said tubes, and from the perforations in the lower shelf out of the perforations in the lower plate, a number of printing rods mounted in said recorder operated by said slides to record through an ink ribbon upon a roll of paper the manipulations of said slides, substantially as shown and described.

9. The combination in a cash recorder of a pair of shelves extending between the side plates thereof, each shelf having a lower plate attached thereto, said shelves and plates having non-coincident perforations, a series of coin tubes extending from the plate under the upper shelf to the upper face of the lower shelf, a number of perforated slides sliding in channels in the abutting faces of said shelves and plates, the perforations in said slides arranged to register with the perforations in said under plates when said slides are drawn out, and to pass under and momentarily register with the perforations in the shelves, and record on a strip of paper each manipulation thereof, substantially as shown and described.

10. The combination in a cash recorder of a pair of shelves extending between the side plates thereof, each shelf having a lower plate attached thereto, said shelves and plates having non-coincident perforations, a series of coin tubes extending from the plate under the upper shelf to the upper face of the lower shelf, a number of perforated slides sliding in channels in the abutting faces of said shelves and plates, the perforations in said slides arranged to register with the perforations in said under plates when said slides are drawn out, and to pass under and momentarily register with the perforations in the shelves, and springs fastened to the under sides of said plates, said springs having each a pointed end, and an in turned middle portion, said middle portion arranged to pass through an opening in said under plate and be held outward by the solid portion of said slide in passing, said perforated portion of said slide passing over said perforation in the under plate and permitting said middle portion to enter therein and said pointed end to block the passage of said slide through a perforation in said under plate, a number of printing rods operated by said slides to record on a roll of paper each manipulation of said slides substantially as shown and described.

11. In a cash recorder having shelves extending across between the side plates thereof, each shelf having under, and attached to it a secondary plate and coin tubes extending from the under plate to the upper surface of the lower shelf, a determinate number of slides in channels between the abutting faces of the shelves and plates, the combination of a number of levers pivoted on a shaft journaled in said recorder, and vertically movable printing rods connected to the slides thereby, and a roller carrying paper to receive impressions thereon from said rods, substantially as shown and described.

12. The combination in a cash recorder of a tier of independent drawers situated to one side of, but included within the case of said recorder and separated from the mechanism hereinafter described by a partition wall, a hinged lid, a shaft journaled in said recorder, said shaft operating a pair of connecting rods, a printing bar operated by said rods to record determinate impressions upon a roll of paper, a roller carrying said paper, and a series of tiers of drawers sliding in ways, a pair of shelves sustaining said ways extending between one of the side-plates of said recorder and said partition wall, printing rods operated by said drawers to record each manipulation of said drawers, substantially as shown and described.

13. In a cash recorder having two shelves extending between two of the sides thereof, a series of tiers of drawers sliding in ways mounted between said shelves, in combination with a number of vertically movable printing rods to print upon paper through an ink ribbon placed thereover, a roller on which said paper is fed, a series of connecting levers operated by means of the drawers during their to and fro motion, substantially as shown and described.

14. The combination in a cash recorder having a pair of shelves extending between the side plates thereof, containing between said shelves a series of coin tubes provided with inlet and outlet coin controlled slides, of a series of tiers of drawers sliding in ways mounted in said shelves, said slides and said drawers operating connecting mechanism, a number of vertically movable printing rods to record upon a roller carrying paper thereunder each manipulation of said slides and drawers, substantially as shown and described.

15. In a cash recorder having a pair of shelves extending between the side plates thereof and a number of tiers of sliding drawers, ways mounted between said shelves to receive said drawers, a number of coin tubes similarly located and provided with inlet and outlet slides, said drawers and slides operating connecting mechanism, a series of vertically movable printing rods actuated by said slides in combination with a roller carrying paper, a pawl mounted on a rocking arm, said arm to actuate said roller and to be rocked by a connecting rod and a crank on a shaft journaled in said recorder, said shaft to be actuated by a lid fast on said shaft, substantially as shown and described.

16. In a cash recorder having a pair of shelves extending between the side plates thereof, a number of tiers of sliding drawers, ways mounted between said shelves to receive said drawers, a number of coin tubes similarly located provided with inlet and outlet slides, a series of vertically movable printing rods operated by said drawers and slides through connecting rods in combination with a roller carrying paper, a pawl on a rocking arm to rotate said roller, a hooked rod on said arm, a pair of rollers with an ink ribbon between them, operated by said hooked arm, said ink ribbon to receive and transmit impressions from said printing rods to said paper, substantially as shown and described.

17. The combination in a cash recorder of a pair of shelves extending between the side plates thereof, a number of tiers of drawers sliding in ways mounted between said shelves, a number of coin tubes similarly located, coin slides forming the inlets and outlets to said tubes, a pair of vertically movable rods for each tier of drawers, said rods being mounted in said recorder and alternately raised and lowered by mechanism attached to said drawers, a series of connecting levers pivoted in said recorder operated by said upright rods; and a number of printing rods mounted in said recorder, to record upon a strip of paper each manipulation of said drawers, substantially as shown and described.

18. In a cash recorder the combination of a number of vertically movable printing rods, mounted in cross bars in its case, the lower ends of said rods bearing determined indicia and to be vertically moved by pivoted levers hinged in said case a series of sliding drawers mounted in ways in said case and operating through connecting levers said hinged levers, substantially as shown and described.

19. In a cash recorder having a pair of shelves extending between the side plates thereof, and a number of sliding drawers, ways mounted between said shelves carrying said drawers, and a number of coin tubes provided with inlet and outlet slides, said slides and drawers operating through a respective number of pivoted levers a number of vertically movable printing rods mounted in cross bars in said recorder in combination with devices substantially as shown and described for turning said rods in said bars a determinate part of a revolution, substantially as shown and described.

20. In a cash recorder having mounted therein a number of vertically movable printing rods raised and lowered by suitable mechanism, each of said rods extending through a perforation in a cross bar, midway the length of said rod, each of said perforations surrounded by two concentric circles of smaller perforations alternating with each other, in combination with a pair of needles fastened to and parallel to said rod, said needles alternately entering one then the other of the smaller perforations as said rod is lowered and raised and revolve the same step by step simultaneously with said raising and lowering, substantially as shown and described.

21. In a cash recorder having an inclosing case, part thereof being higher than the remainder, having a shelf on one side thereof, said shelf having a slot in its upper face and a roller journaled in the sides of said case directly under said slot, and a roller carrying paper and under said slot in combination with a series of vertically moving and horizontally revoluble printing rods to imprint upon said paper through an ink ribbon their respective indicia substantially as shown and described.

22. In a cash recorder having a slot in one of the upper faces thereof and a roller carrying paper journaled in the sides of said case directly under said slot, said paper passing over said roller and under said slot and a hand lever pivoted on the shaft of said roller shaft provided with an inturned stud to enter, one at a time, orifices in the end of said lever in combination with series of vertically moving and horizontally revoluble printing rods, to imprint upon said paper through an ink ribbon their respective indicia, substantially as shown and described.

23. In a cash recorder having a pair of shelves extending between the side plates thereof, each shelf having a secondary plate fastened to its under surface, a number of coin tubes extending from the under plate of the first shelf to the upper surface of the lower shelf, said shelves and plates having non-coincident openings, and a number of perforated slides, sliding in channels in the abutting faces of said shelves and plates, the perforations in said slides passing under the perforations in the shelves and over the perforations in the plates in combination with a number of tiers of drawers sliding in ways mounted between said shelves, a series of vertically movable printing rods mounted in said recorder, a respective number of rods, connecting said drawers and slides to said printing rods and means such as a pair of needles entering alternate perforations in a plate for causing each of said rods to make a partial revolution at each vertical motion thereof substantially as shown and described.

24. In a cash recorder having a pair of shelves extending between the side plates thereof, said shelves having secondary plates attached to the under sides thereof and perforated slides between said shelves and plates, a series of vertically movable and horizontally revoluble printing rods, operated by said slides, in combination with a number of vertically slotted tubes extending from the under surface of the plate under the upper shelf to the upper surface of the lower shelf, substantially as shown and described.

25. In a cash recorder having a pair of shelves between the side plates thereof, a series of tiers of drawers, sliding in ways mounted between said shelves, said drawers having one portion made with a bottom and lid, and the remaining portion consisting of a frame, each side whereof is provided with diamond shaped plates in combination with a number of vertically movable rods mounted in said recorder bearing studs on the sides thereof to be engaged by said plates and raise said rods, said rods being connected to a series of levers, a number of printing rods attached to said levers adapted to record upon a strip of paper each manipulation of said drawers, substantially as shown and described.

26. In a cash recorder having a pair of shelves extending between the side plates thereof, and a series of tiers of sliding drawers in ways mounted between the side plates thereof, said drawers having a closed portion provided with a bottom and lid, the remaining portion thereof being open and provided on the inner sides with a pair of diamond shaped plates, a pair of vertically movable rods for each tier, having studs on the sides thereof, said plates alternately raising first one and then the other of said rods in combination with a number of printing rods mounted in said case, to record upon paper each manipulation of said drawers through a series of connected pivoted levers, substantially as shown and described.

27. The combination in a cash recorder having a series of vertically movable and horizontally revoluble printing rods a pivoted printing bar, a roller carrying paper moved at determinate intervals, a lid in said recorder hinged on a shaft therein, said lid operating through connecting mechanism the printing bar alternately with the motion of said paper, substantially as shown and described.

28. In a cash recorder vertically movable bars mounted in cross bars passing through a perforated plate, said plate being provided with a pair of circles of smaller perforations concentric with said central perforations in combination with a pair of needles fastened to and parallel with said bar, with points slightly passing each other and arranged to alternately enter first one then the other of said smaller perforations, as said bar is vertically moved and adapted to rotate said bar a determinate part of a revolution, substantially as shown and described.

29. The combination of a drawer sliding in ways, said drawer provided with a covered portion and an open portion, having diamond shaped plates on the sides thereof with a number of vertically movable rods having studs on the sides thereof, arranged to be engaged and operated by the said plate and raise said rods and a series of printing rods connected to said bars by connecting rods to record each manipulation of said drawers upon a sheet of paper, substantially as shown and described.

30. The combination in a cash recorder of a pair of shelves connected by coin tubes, said shelves being perforated, and a number of perforated coin slides arranged to slide in said shelves and to convey coins from said perforations in said shelves to said tubes and again from said tubes through and out of the lower shelf, and a determinate number of vertically moving printing rods connected thereto by rods to record each manipulation thereof upon a strip of paper, substantially as shown and described.

In testimony that I claim the above I hereunto set my hand.

JOSEPH R. SAPP.

In presence of—
C. E. HUMPHREY,
R. A. MYERS.